United States Patent
Cai et al.

(10) Patent No.: US 9,138,867 B2
(45) Date of Patent: Sep. 22, 2015

(54) ABRASIVE PRODUCTS AND METHODS FOR FINISHING SURFACES

(71) Applicants: Ying Cai, Shrewsbury, MA (US); James J. Manning, Braintree, MA (US); Jianna Wang, Grafton, MA (US)

(72) Inventors: Ying Cai, Shrewsbury, MA (US); James J. Manning, Braintree, MA (US); Jianna Wang, Grafton, MA (US)

(73) Assignees: Saint-Gobain Abrasives, Inc., Worcester, MA (US); Saint-Gobain Abrasifs, Conflans-Saint-Honorine (FR)

( * ) Notice: Subject to any disclaimer, the term of this patent is extended or adjusted under 35 U.S.C. 154(b) by 0 days.

(21) Appl. No.: 13/839,921

(22) Filed: Mar. 15, 2013

(65) Prior Publication Data

US 2013/0298471 A1 Nov. 14, 2013

Related U.S. Application Data

(60) Provisional application No. 61/611,881, filed on Mar. 16, 2012.

(51) Int. Cl.

| B24D 3/00 | (2006.01) |
|---|---|
| B24D 3/04 | (2006.01) |
| B24D 11/00 | (2006.01) |
| B24D 18/00 | (2006.01) |
| C09K 3/14 | (2006.01) |
| B24D 3/28 | (2006.01) |
| B24B 37/24 | (2012.01) |

(52) U.S. Cl.
CPC ............... *B24D 3/28* (2013.01); *B24B 37/245* (2013.01); *C09K 3/1436* (2013.01)

(58) Field of Classification Search
USPC .................................... 51/298, 293, 307, 309
See application file for complete search history.

(56) References Cited

U.S. PATENT DOCUMENTS

| 2,277,520 A | 3/1942 | Martin et al. |
| 3,916,584 A | 11/1975 | Howard et al. |
| 3,928,949 A | 12/1975 | Wagner |
| 4,018,574 A | 4/1977 | Dyer |
| 4,311,489 A | 1/1982 | Kressner |
| 4,547,204 A | 10/1985 | Caul |
| 4,576,612 A | 3/1986 | Shukla et al. |

(Continued)

FOREIGN PATENT DOCUMENTS

| CN | 1088506 A | 6/1994 |
| CN | 101068656 A | 11/2007 |

(Continued)

OTHER PUBLICATIONS

SK Chemicals Co., Ltd., "Skybon, ES-120 Thermoplastic Copolyester for Solventborne Applications," 1 pg.

(Continued)

*Primary Examiner* — James McDonough
(74) *Attorney, Agent, or Firm* — Joseph P. Sullivan; Abel Law Group, LLP

(57) ABSTRACT

An engineered coated abrasive product having a three dimensional pattern of abrasive structures formed by embossing an abrasive slurry formulation that was first surface coated with a functional powder, wherein the abrasive slurry includes green, unfired abrasive aggregates having a generally spheroidal or toroidal shape, the aggregates formed from a composition comprising abrasive grit particles and a nanoparticle binder. The coated abrasive product is capable of finishing and repairing defects in surfaces, including coated surfaces.

11 Claims, 7 Drawing Sheets

(56) References Cited

U.S. PATENT DOCUMENTS

| | | |
|---|---|---|
| 4,609,380 A | 9/1986 | Barnett et al. |
| 4,629,473 A | 12/1986 | Ruid et al. |
| 4,644,703 A | 2/1987 | Kaczmarek et al. |
| 4,652,275 A | 3/1987 | Bloecher et al. |
| 4,751,138 A | 6/1988 | Tumey et al. |
| 4,842,619 A | 6/1989 | Fritz et al. |
| 4,867,759 A | 9/1989 | Tiefenbach et al. |
| 4,918,874 A | 4/1990 | Tiefenbach, Jr. |
| 4,920,082 A | 4/1990 | Danielson |
| 4,927,431 A | 5/1990 | Buchanan et al. |
| 5,011,513 A | 4/1991 | Zador et al. |
| 5,014,468 A | 5/1991 | Ravipati et al. |
| 5,094,670 A | 3/1992 | Imada |
| 5,108,463 A | 4/1992 | Buchanan |
| 5,137,542 A | 8/1992 | Buchanan et al. |
| 5,198,292 A | 3/1993 | Lerner et al. |
| 5,219,462 A | 6/1993 | Bruxvoort et al. |
| 5,250,085 A | 10/1993 | Mevissen |
| 5,256,170 A | 10/1993 | Harmer et al. |
| 5,304,586 A | 4/1994 | Hammesfahr et al. |
| 5,328,716 A | 7/1994 | Buchanan |
| 5,360,462 A | 11/1994 | Harmer et al. |
| 5,431,596 A | 7/1995 | Akita |
| 5,436,053 A | 7/1995 | Herum |
| 5,437,754 A | 8/1995 | Calhoun |
| 5,453,312 A | 9/1995 | Haas et al. |
| 5,454,844 A | 10/1995 | Hibbard et al. |
| 5,549,719 A | 8/1996 | Lee et al. |
| 5,584,897 A | 12/1996 | Christianson et al. |
| 5,632,668 A | 5/1997 | Lindholm et al. |
| 5,667,541 A | 9/1997 | Klun et al. |
| 5,672,097 A | 9/1997 | Hoopman |
| 5,730,764 A | 3/1998 | Williamson et al. |
| 5,766,277 A | 6/1998 | DeVoe et al. |
| 5,833,724 A * | 11/1998 | Wei et al. ............... 51/307 |
| 5,840,088 A | 11/1998 | Yang et al. |
| 5,863,239 A | 1/1999 | Barton, II |
| 5,863,306 A * | 1/1999 | Wei et al. ............... 51/295 |
| 5,863,847 A | 1/1999 | De Voe et al. |
| 5,876,268 A | 3/1999 | Lamphere et al. |
| 5,906,490 A | 5/1999 | Kramer Primus et al. |
| 5,913,716 A | 6/1999 | Mucci et al. |
| 5,924,917 A | 7/1999 | Benedict et al. |
| 5,954,844 A | 9/1999 | Law et al. |
| 6,024,634 A | 2/2000 | Hoglund et al. |
| 6,074,281 A | 6/2000 | Swanson et al. |
| 6,077,601 A | 6/2000 | DeVoe et al. |
| 6,155,910 A * | 12/2000 | Lamphere et al. ............... 451/41 |
| 6,171,224 B1 | 1/2001 | Phillips |
| 6,197,076 B1 | 3/2001 | Braunschweig et al. |
| 6,231,629 B1 | 5/2001 | Christianson et al. |
| 6,238,450 B1 | 5/2001 | Garg et al. |
| 6,258,136 B1 | 7/2001 | Kinisky et al. |
| 6,261,682 B1 | 7/2001 | Law |
| 6,287,184 B1 | 9/2001 | Carpentier et al. |
| 6,372,336 B1 | 4/2002 | Clausen et al. |
| 6,375,692 B1 | 4/2002 | Manwiller et al. |
| 6,395,044 B1 | 5/2002 | Swei et al. |
| 6,406,576 B1 | 6/2002 | Benedict et al. |
| 6,451,076 B1 * | 9/2002 | Nevoret et al. ............... 51/298 |
| 6,517,423 B2 | 2/2003 | Ueno |
| 6,551,366 B1 | 4/2003 | D'Souza et al. |
| 6,551,974 B1 | 4/2003 | Conrad et al. |
| 6,645,624 B2 | 11/2003 | Adefris et al. |
| 6,646,999 B1 | 11/2003 | Kato et al. |
| 6,702,650 B2 | 3/2004 | Adefris |
| 6,753,359 B2 | 6/2004 | Thurber et al. |
| 6,773,475 B2 | 8/2004 | Ohishi |
| 6,790,126 B2 | 9/2004 | Wood et al. |
| 6,797,023 B2 | 9/2004 | Knapp et al. |
| 6,858,292 B2 | 2/2005 | Kendall |
| 6,953,381 B2 | 10/2005 | Siders et al. |
| 7,005,080 B2 | 2/2006 | Holland et al. |
| 7,066,601 B2 | 6/2006 | Lee et al. |
| 7,279,119 B2 | 10/2007 | Hellring et al. |
| 7,294,158 B2 | 11/2007 | Welygan et al. |
| 7,594,845 B2 * | 9/2009 | Lugg et al. ............... 451/41 |
| 7,658,665 B2 | 2/2010 | Subramanian et al. |
| 7,935,158 B2 | 5/2011 | Querel et al. |
| 7,981,173 B2 | 7/2011 | Ali et al. |
| 8,038,751 B2 | 10/2011 | Starling |
| 8,043,393 B2 | 10/2011 | Querel et al. |
| 8,062,098 B2 | 11/2011 | Duescher |
| 8,105,453 B2 | 1/2012 | Kawamura et al. |
| 8,361,176 B2 | 1/2013 | Seth et al. |
| 2001/0003884 A1 | 6/2001 | Wei et al. |
| 2002/0090891 A1 | 7/2002 | Adefris et al. |
| 2003/0066246 A1 | 4/2003 | Swei et al. |
| 2003/0150169 A1 | 8/2003 | Annen |
| 2003/0175498 A1 | 9/2003 | Hunt et al. |
| 2003/0213182 A1 | 11/2003 | Knapp et al. |
| 2004/0067649 A1 | 4/2004 | Hellring et al. |
| 2004/0115431 A1 | 6/2004 | Chen et al. |
| 2005/0064805 A1 | 3/2005 | Culler et al. |
| 2005/0113005 A1 | 5/2005 | Woo et al. |
| 2005/0223649 A1 | 10/2005 | O'Gary et al. |
| 2006/0026904 A1 | 2/2006 | Woo et al. |
| 2006/0046622 A1 | 3/2006 | Prasad |
| 2006/0148392 A1 | 7/2006 | Ono et al. |
| 2006/0183412 A1 | 8/2006 | Allison et al. |
| 2006/0260208 A1 | 11/2006 | Swei et al. |
| 2007/0066197 A1 | 3/2007 | Woo et al. |
| 2007/0243802 A1 | 10/2007 | Petersen et al. |
| 2007/0298240 A1 | 12/2007 | Gobena et al. |
| 2008/0092455 A1 | 4/2008 | You |
| 2008/0172951 A1 | 7/2008 | Starling |
| 2009/0011692 A1 | 1/2009 | Miekka et al. |
| 2010/0005727 A1 | 1/2010 | Gaeta et al. |
| 2010/0022170 A1 | 1/2010 | Starling et al. |
| 2010/0107509 A1 | 5/2010 | Guselin |
| 2010/0159805 A1 | 6/2010 | Goldsmith et al. |
| 2011/0045739 A1 | 2/2011 | Keijzer et al. |
| 2011/0053460 A1 | 3/2011 | Culler et al. |
| 2012/0094579 A1 | 4/2012 | Starling |
| 2012/0192500 A1 | 8/2012 | Wang et al. |

FOREIGN PATENT DOCUMENTS

| | | |
|---|---|---|
| CN | 10267915 A | 9/2008 |
| DE | 2350139 | 4/1975 |
| EP | 193296 A1 | 9/1986 |
| EP | 444824 A2 | 9/1991 |
| EP | 211591 B1 | 3/1993 |
| EP | 650803 A1 | 5/1995 |
| EP | 1339531 B1 | 8/2007 |
| EP | 2436747 A3 | 4/2012 |
| JP | 61192479 | 8/1986 |
| JP | 61297083 | 12/1986 |
| JP | 6234780 A | 2/1987 |
| JP | H01303626 | 12/1989 |
| JP | H04500044 A | 1/1992 |
| JP | 63052971 | 3/1998 |
| JP | 10-202538 A | 8/1998 |
| JP | 2003011068 | 1/2003 |
| JP | 2003062754 | 3/2003 |
| JP | 2003071729 | 3/2003 |
| JP | 2003511249 | 3/2003 |
| JP | 2004174712 | 6/2004 |
| JP | 200551950 A | 6/2005 |
| JP | 2005522341 | 7/2005 |
| JP | 2006510499 | 3/2006 |
| JP | 200800853 | 1/2008 |
| TW | 200422366 A | 11/2004 |
| WO | 9001397 A1 | 2/1990 |
| WO | 9201536 A1 | 2/1992 |
| WO | 0238338 A2 | 5/2002 |
| WO | 02102920 A1 | 12/2002 |
| WO | 2005099280 A2 | 10/2005 |
| WO | 2006050792 A1 | 5/2006 |
| WO | 2006112909 A1 | 10/2006 |
| WO | 2007035292 A1 | 3/2007 |
| WO | 2008008535 A1 | 1/2008 |

(56) References Cited

FOREIGN PATENT DOCUMENTS

| | | |
|---|---|---|
| WO | 2008091939 A3 | 7/2008 |
| WO | 2010011579 A2 | 1/2010 |
| WO | 2010075041 A2 | 7/2010 |

OTHER PUBLICATIONS

Norton, Saint-Gobain, "High-Performance Lapping Products for Roll Finishing," Copyright Saint-Gobain Abrasives, Inc., Rev. Feb. 2011, 2 pgs.

Burgess Pigment, "Burgess No. 98, Hydrous Aluminum Silicate" 1 pg.

ADM, "Material Safely Data Sheet—Yelkin TS", Preparation Date: Apr. 17, 2009, Revision Date: Apr. 17, 2009, 7 pgs.

Mornentive, "Technical Data Sheet, EPON™ Resin 1001F", Re-issued Sep. 2007, 4 pgs.

Carbide Depot, "Hardness Conversion Chart", Technical Resources for Manufacturing Professionals, 3 pgs.

Woods, Susan, Cutting Tool Engineering Plus, "High-Velocity Grind", Feb. 2011, vol. 63, Issue 2, 9 pgs.

Werner Blank, "Isocyanate—TDI Isocyanate", Last edited on: Jul. 6, 2006, 3 pgs.

BYK Additives & Instruments, "BYK-410 Material Safety Data Sheet" Version 4, Revision Date Feb. 27, 2011, Print Date Feb. 7, 2011, 10 pgs.

BYK Additives & Instruments, "BYK-410 Data Sheet—Liquid Rheology Additives for Solvent-borne and Solvent-free Systems" Data Sheet R200, Issue 02/10, 4 pgs.

Rohm and Haas, "Adcote# 545S/Coreactant F", Copyright Rohm and Haas, 2008, 3 pgs.

3M Innovation, "Systematic Processes for Finishing Wear Resistant Thermaly Spray Coatings with Flexible Superabrasives," Sponsored by ESTCP, JG-PP, PEWG, Nov. 19, 2003, 31 pgs.

3M Corporation, "Roll Grinding, Superfinishing and Microfinishing Systems," Superabrasives and Microfinishing Systems Division, Copyright 3M 1996, 12 pgs.

SKChemicals, Skybon Product Info, accessed Apr. 28, 2012 at http://www.skchemicals.com/english/products/poly/sub/sub3-1.asp, 2 pgs.

CYTEC "Cymel® Armino Resin Corsslinkers for the Coating Industry, Product and Application Guide, Europe, Middle East and Africa,", Copyright 2008 Cytec Industries, Inc., 42 pgs.

Air Products "Dabco © T-12 Catalyst", Copyright, Air Products and Chemicals, Inc., 2003, 2 pgs.

International Search Report for PCT/US2008/051785 mailed Aug. 6, 2008, 1 pg.

International Search Report for PCT/US2009/051045 mailed Mar. 3, 2010, 1 pg.

International Search Report for PCT/US2009/067914 mailed Jul. 26, 2010, 1 pg.

International Search Report for PCT/US2013/032402 mailed Jul. 1, 2013, 1 pg.

International Search Report for PCT/US2012/057852 mailed Mar. 5, 2013, 1 pg.

International Search Report for PCT/US2013/021039 mailed Apr. 25, 2013, 1 pg.

International Search Report for PCT/US2013/034700 mailed Jul. 13, 2013, 1 pg.

International Search Report for PCT/US2013/048730 mailed Sep. 11, 2013, 1 pg.

International Search Report for PCT/US2011/068249 mailed Aug. 29, 2012, 1 pg.

\* cited by examiner

ABRASIVE PRODUCTS AND METHODS FOR FINISHING SURFACES

CROSS-REFERENCE TO RELATED APPLICATION(S)

The present application claims priority from U.S. Provisional Patent Application No. 61/611,811, filed Mar. 16, 2012, entitled "ABRASIVE PRODUCTS AND METHODS FOR FINISHING SURFACES," naming inventors Ying Cai, James Manning and Jianna Wang, which application is incorporated by reference herein in its entirety.

BACKGROUND

1. Field of the Disclosure

The present disclosure is generally directed to engineered abrasive products and methods related to the polishing and finishing of surfaces including natural and synthetic substrates, such as metal, ceramic, wood, polymeric, glass, and stone.

2. Description of the Related Art

Abrasive products, such as engineered coated abrasive products, are used in various industries to abrade work pieces, such as by lapping, grinding, or polishing. Surface processing using engineered coated abrasives spans a wide industrial and consumer scope from optics industries to metal fabrication industries. Effective and efficient fine polishing of surfaces, particularly metal, glass, ceramic, stone, and coated surfaces poses numerous challenges.

Surface characteristics, such as surface roughness and surface uniformity can influence the appearance, performance and longevity of a workpiece. In particular, surface characteristics, such as surface roughness, gloss, and lack of surface imperfections can be measured to determine surface quality. For example, Mill rolls and engine components rely on metal surfaces that have been precision polished to achieve proper performance and efficiency.

Typically, any defects in a surface are removed by first abrading with a coarse grain abrasive, followed by subsequently abrading with progressively finer grain abrasives until a desired smoothness (i.e., acceptable roughness) is achieved. Hence, the properties of the abrasive product used will generally influence the surface quality.

In addition to surface characteristics, industries are sensitive to cost related to abrasive operations. Factors influencing operational costs include the speed at which a surface can be prepared and the cost of the materials used to prepare that surface. Typically, industry seeks cost effective materials having high material removal rates. However, abrasives that exhibit high removal rates often also exhibit poor performance in achieving desirable surface characteristics. Conversely, abrasives that produce desirable surface characteristics often times have low material removal rates. For this reason, preparation of a surface is often a multi-step process using various grades of abrasives. Typically, surface flaws (e.g., scratches) introduced by one step are repaired (e.g., removed) using progressively finer grain abrasives in one or more subsequent steps. Therefore, abrasives that introduce scratches and surface flaws result in increased time, effort, and expenditure of materials in subsequent processing steps and an overall increase in total processing costs.

An additional factor affecting material removal rate and surface quality is the "loading" of the abrasive with "swarf", i.e., the material that is abraded from the workpiece surface, which tends to accumulate on the surface of, and between, the abrasive particles. Loading is undesirable because it typically reduces the effectiveness of the abrasive product and can also negatively affect surface characteristics by increasing the likelihood of scratching defects.

Surface characteristics and material removal rate can also be affected by the durability of the abrasive product. Abrasive products that wear easily or lose abrasive grains can exhibit both a low material removal rate and can cause surface defects. Rapid wear on the abrasive product can lead to a reduction in material removal rate, resulting in time lost for frequent exchanging of the abrasive product and increased waste associated with discarded abrasive product.

There continues to be a demand for improved, cost effective, abrasive products, processes, and systems that promote efficient abrasion and improved surface characteristics.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE EMBODIMENT(S)

The following description, in combination with the figures, is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "averaged," when referring to a value, is intended to mean an average, a geometric mean, or a median value.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the engineered abrasive arts.

Figure 1:
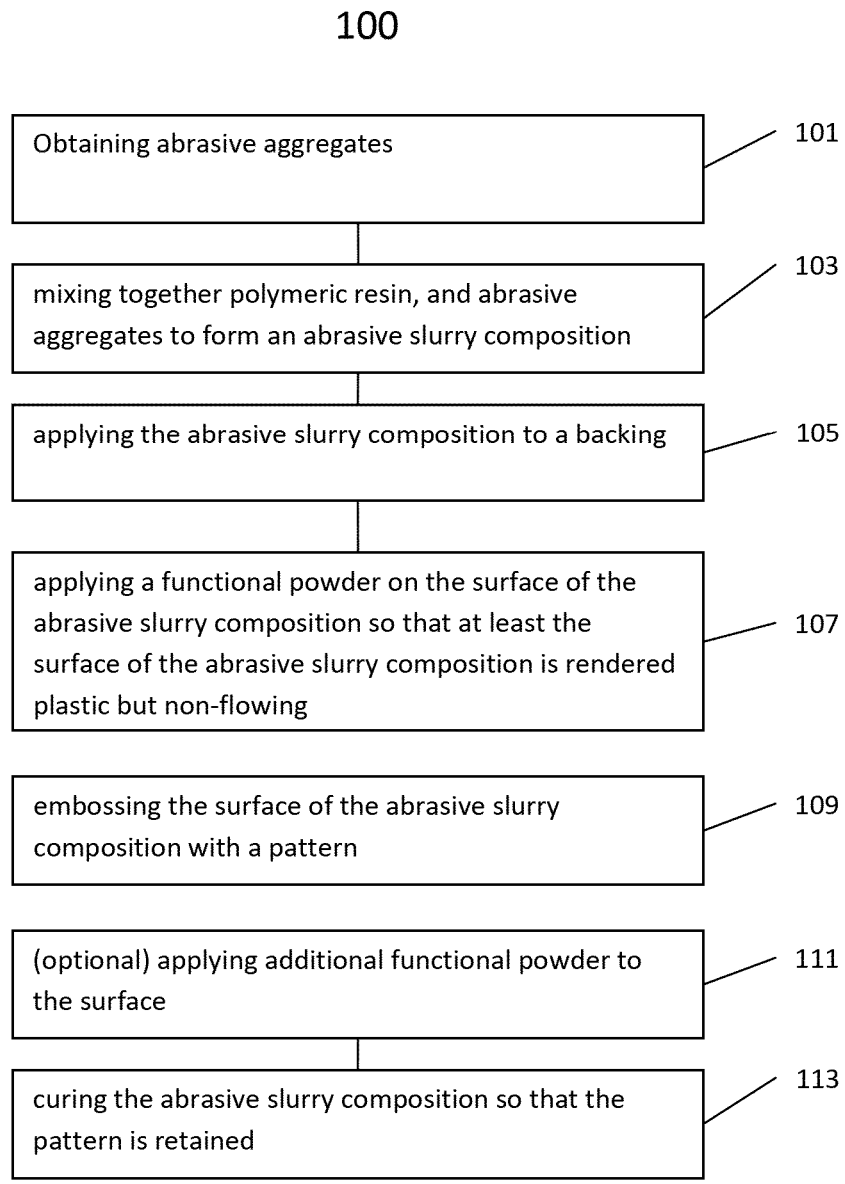
FIG. 1 is a process diagram of an embodiment of a method of forming an engineered abrasive product.

FIG. 1 shows a particular embodiment of a method 100 of making an engineered coated abrasive product. The process is initiated at activity 101 by obtaining green, unfired abrasive aggregates having a generally spheroidal or toroidal shape, the abrasive aggregates being formed from a composition comprising abrasive grit particles and a nanoparticle binder, wherein the nanoparticle binder forms a continuous matrix phase in which the abrasive grit particles are uniformly distributed. In activity 103, mixing together of polymer resin, the abrasive aggregates, a cross-linking agent, and a catalyst occurs to form an abrasive slurry formulation. In activity 105, applying the abrasive slurry formulation to a backing occurs. Treating the deposited slurry formulation to render at least the surface portion of the slurry formulation plastic but non-flowing occurs in activity 107. In activity 109, embossing a pattern upon the slurry formulation occurs. Curing the abrasive slurry formulation to retain the embossed pattern and thus form an engineered abrasive occurs during activity 113. Optionally, applying additional abrasive grains, functional powders, or other surface treatments can occur during activity 111, after embossing of the pattern 109 but prior to curing 113.

As used herein, the term "aggregate" may be used to refer to a particle made of a plurality of smaller particles that have been combined in such a manner that it is relatively difficult to separate or disintegrate the aggregate particle into smaller particles by the application of pressure or agitation. This is in contrast to the term "agglomerate," which is used herein to refer to a particle made up of a plurality of smaller particles that have been combined in such a manner that it is relatively easy to separate the agglomerate particle or disintegrate the agglomerate particle back into smaller particles, such as by the application of pressure or hand agitation.

Abrasive Aggregates

According to an embodiment, abrasive aggregates are provided that are particularly suitable for machining operations, in which abrasion is carried out to remove material and improve surface quality. Abrasive aggregates can be formed through slurry-based processing. Embodiments can take advantage of spray drying, where a slurry containing the constituent materials of the aggregates and a liquid carrier, such as water, are mixed together, nebulized into droplets, and dried. Certain embodiments combine an abrasive grit, a binder, a dispersant, and a cross-linking agent.

Suitable green, unfired abrasive aggregates include, for instance, those described in, and produced according to the methods of U.S. Pat. No. 8,038,751 to Starling. The teachings of U.S. Pat. No. 8,038,751 to Starling that are related to the making of green, unfired abrasive aggregates are hereby incorporated by reference for all purposes. Suitable abrasive aggregates are also available from Saint-Gobain Abrasives, Inc. under the brand name Nanozyte® and are exemplary of green, unfired abrasive aggregates. According to certain embodiments, the abrasive product includes green unfired abrasive aggregates having a composite structure, including both abrasive grits that have a size within the microparticle range, and a nanoparticle binder that provides the matrix of the abrasive aggregate in which the abrasive grits are embedded or contained.

Typically, the abrasive aggregates are utilized in the abrasive product without notable post-formation heat treatment, such as calcining, sintering, or recrystallization that would alter the crystallite size, grain size, density, tensile strength, young's modulus, and the like of the abrasive aggregates. Such heat treatment processes, though common, and which are generally carried out in excess of 400° C., generally 500° C. and above, easily ranging from 800° C. to 1200° C. and above for certain ceramic species, are not utilized herein.

The abrasive aggregates have a notable morphology, characterized by uniform distribution of the abrasive grits in the nanoparticle binder. Additionally, the abrasive aggregates have a generally spheroidal or a toroidal shape, the abrasive aggregates formed from a composition comprising abrasive grit particles and a nanoparticle binder. The aggregates can be solid spheres, spheroids, and toroids. Alternatively, the aggregates can be hollow spheres, spheroids, and toroids. When viewed under magnification, as shown in the scanning electron micrographs of FIG. 6 to FIG. 10, the abrasive aggregates have a generally spheroidal shape, being characterized as rounded or spherical. In some instances, however, the abrasive aggregates may be observed to have a void near the center of the abrasive aggregate and thus exhibit a more toroid-or torus-like shape, also as seen in the scanning electron micrographs of FIG. 6 to FIG. 10. Individual particles of the abrasive grit material can be observed to be dispersed over the surface of the abrasive aggregates and within the interior thereof. It is noted that FIG. 6 to FIG. 10 show dispersed, individual abrasive aggregates that are bound together in a resin binder system.

The size and the size range of the abrasive aggregates may be adjusted and may depend on many factors, including the composition of the mixture and, if a spray dryer is used in the abrasive aggregate formation, the spray dryer feed rate. For example, abrasive aggregates of sizes including those of approximately 15 micrometers, 20 micrometers, 35 micrometers, 40 micrometers, 45 micrometers, 50 micrometers, 55 micrometers, 60 micrometers, 65 micrometers, and 70 micrometers have been successfully produced using a spray dryer. These abrasive aggregates can include abrasive grit particles ranging from about 5 to about 15 micrometers. In particular embodiments, the abrasive aggregate size ranges from about 20 micrometers to about 70 micrometers, about 30 micrometers to about 65 micrometers, or about 35 micrometers to about 60 micrometers. In another embodiment, the average abrasive aggregate size ranges from about 45 to about 55 micrometers, or about 50 micrometers.

Further study of the abrasive aggregates has revealed that in some embodiments spheroids are hollow, while in other embodiments the aggregates are solid, and in even other embodiments, the aggregates are essentially filled with grain and/or nanoparticle binder. Hollow particles can be analogized to thick-shelled racquet balls, having a wall thickness ($t_w$) within a range of about 0.08 to about 0.4 times the average particle size of the abrasive aggregates. Process parameters and compositional parameters can be modified to effect different wall thicknesses.

Once formed, the abrasive aggregates may, if desired, be classified and/or separated into various size ranges before being applied to a backing or otherwise utilized in a polishing operation. Classification of the abrasive aggregates can be accomplished by sieving, sorting, or gravimetric separation techniques. In an embodiment, the abrasive aggregates can be classified by being passed through a standard size mesh screen, such as for example a standard 170 mesh screen, which allows pass-though of particles having an average particle size of approximately 90 microns.

Abrasive Grit Particles

The abrasive grit particles that form the abrasive aggregates generally have a Mohs hardness of greater than about 3, and preferably from about 3 to about 10. For particular applications, the abrasive grit particles have a Mohs hardness at least 5, 6, 7, 8, or 9. In an embodiment the abrasive grit particles have a Mohs hardness of 9. The abrasive grit particles are generally believed to serve as the primary active grinding or polishing agent in the abrasive aggregates. Examples of suitable abrasive compositions include non-metallic, inorganic solids such as carbides, oxides, nitrides and certain carbonaceous materials. Oxides include silicon oxide (such as quartz, cristobalite and glassy forms), cerium oxide, zirconium oxide, aluminum oxide. Carbides and nitrides include, but are not limited to, silicon carbide, aluminum, boron nitride (including cubic boron nitride), titanium carbide, titanium nitride, silicon nitride. Carbonaceous materials include diamond, which broadly includes synthetic diamond, diamond-like carbon, and related carbonaceous materials such as fullerite and aggregate diamond nanorods. Materials may also include a wide range of naturally occurring mined minerals, such as garnet, cristobalite, quartz, corundum, feldspar, by way of example. Certain embodiments of the present disclosure, take advantage of diamond, silicon carbide, aluminum oxide, and/or cerium oxide materials, with silicon carbide being shown to be notably effective. In addition, those of skill will appreciate that various other compositions possessing the desired hardness characteristics may be used as abrasive grit particles in the abrasive aggregates of the present disclosure. In addition, in certain embodiments according to the present disclosure, mixtures of two or more different abrasive grit particles can be used in the same abrasive aggregates.

As should be understood from the foregoing description, a wide variety of abrasive grit particles may be utilized in embodiments. Of the foregoing, cubic boron nitride and diamond are considered "superabrasive" particles, and have found widespread commercial use for specialized machining operations, including highly critical polishing operations.

Further, the abrasive grit particles may be treated so as to form a metallurgical coating on the individual particles prior to incorporation into the abrasive aggregates. The superabrasive grits are particularly suitable for coating. Typical metallurgical coatings include nickel, titanium, copper, silver and alloys and mixtures thereof.

In general, the size of the abrasive grit particles lies in the microparticle range. As used herein, the term "microparticle," may be used to refer to a particle having an average particle size of from about 0.1 microns to about 50 microns, preferably at least about 0.2 microns, about 0.5 microns, or about 0.75 microns, and not greater than about 30 microns, such as not greater than about 25 microns, not greater than about 20 microns, or not greater than about 15 microns. Particular embodiments have an average particle size from about 0.3 microns to about 20 microns. The size of the abrasive grit particles can vary upon the type of grit particles being used. For example, diamond grit particles can have a size of about 0.3 to about 20 microns, silicon carbide grit particles can have a size of about 0.3 to about 20 microns, and aluminum oxide grit particles can have a size of about 0.3 to about 20 microns.

It should be noted that the abrasive grit particles can be formed of abrasive aggregates of smaller particles such as abrasive aggregate nanoparticles, though more commonly the abrasive grits are formed of single particles within the microparticle range. As used herein, the term "nanoparticle," may be used to refer to a particle having an average particle size of from about 5 nm to about 150 nm, typically less than about 100 nm, 80 nm, 60 nm, 50 nm, or less than about 50 nm. For instance, a plurality of nano-sized diamond particles may be aggregated together to provide a microparticle of diamond grit. The size of the abrasive grit particles can vary depending upon the type of grit particles being used.

The abrasive grit particles may, in general, constitute between about 0.1% to about 85% of the abrasive aggregates. The abrasive aggregates more preferably include between about 10% to about 50% by weight of the abrasive grit particles.

In one embodiment, abrasive aggregates may be formed using a single size of abrasive grit particle, the size of the grit particle and the resultant aggregates both being tailored to the desired polishing application. In other embodiments, mixtures of two or more differently sized abrasive grit particles may be used in combination to form abrasive aggregates having advantageous characteristics attributable to each of the grit particle sizes.

Nanoparticle Binder

The abrasive aggregates according to the present disclosure also include a nanoparticle binder material as stated above. The nanoparticle binder generally forms a continuous matrix phase that functions to form and hold the abrasive grit particles together within the abrasive aggregates in the nature of a binder. In this respect, it should be noted that the nanoparticle binder, while forming a continuous matrix phase, is itself generally made up of individually identifiable nanoparticles that are in intimate contact, interlocked and, to a certain extent, atomically bonded with each other. However, due to the green, unfired state of the thus formed abrasive aggregates, the individual nanoparticles are generally not fused together to form grains, as in the case of a sintered ceramic material. As used herein, description of nanoparticle binder extends to one or multiple species of binders.

The nanoparticle binder material may comprise very fine ceramic and carbonaceous particles such as nano-sized silicon dioxide in a liquid colloid or suspension (known as colloidal silica). Nanoparticle binder materials may also include, but are not limited to, colloidal alumina, nano-sized cerium oxide, nano-sized diamond, and mixtures thereof. Colloidal silica is preferred for use as the nanoparticle binder in certain embodiments of the present disclosure. For example, commercially available nanoparticle binders that have been used successfully include the colloidal silica solutions BINDZEL 2040 BINDZIL 2040 (available from Eka Chemicals Inc. of Marietta, Ga.) and NEXSIL 20 (available from Nyacol Nano Technologies, Inc. of Ashland, Mass.).

Before the mixture is spray dried to form the aggregates, the mixture may include an amount of nanoparticle binder material ranging between about 0.1% to about 80%, preferably ranging between about 10% to about 30% on a wet basis. In the formed abrasive aggregates, the nanoparticle binder material may constitute between about 1% to about 90% of the aggregates, preferably between about 20% to about 80% of the aggregates, and most preferably between about 50% to about 75% of the aggregates, all on a dry weight basis.*

Plasticizer

The slurry for forming the abrasive aggregates also advantageously includes a material which serves primarily as a plasticizer, also known as a dispersant, to promote dispersion of the abrasive grit within the thus formed aggregates.

Plasticizers include both organic and inorganic materials, including surfactants and other surface tension modifying species. Particular embodiments make use of organic species, such as polymers and monomers. In an exemplary embodiment, the plasticizer is a polyol. For example, the polyol may be a monomeric polyol or may be a polymeric polyol. An exemplary monomeric polyol includes 1,2-propanediol; 1,4-propanediol; ethylene glycol; glycerin; pentaerythritol; sugar alcohols such as malitol, sorbitol, isomalt, or any combination thereof; or any combination thereof. An exemplary polymeric polyol includes polyethylene glycol; polypropylene glycol; poly(tetramethylene ether)glycol; polyethylene oxide; polypropylene oxide; a reaction product of glycerin and propylene oxide, ethylene oxide, or a combination thereof; a reaction product of a diol and a dicarboxylic acid or its derivative; a natural oil polyol; or any combination thereof. In an example, the polyol may be a polyester polyol, such as a reaction products of a diol and a dicarboxylic acid or its derivative. In another example, the polyol is a polyether polyol, such as polyethylene glycol, polypropylene glycol, polyethylene oxide, polypropylene oxide, or a reaction product of glycerin and propylene oxide or ethylene oxide. In particular, the plasticizer includes polyethylene glycol (PEG).

Fillers

The mixture for forming the abrasive aggregates can contain one or more fillers. Suitable fillers include: metal carbonates; such as calcium carbonate and sodium carbonate; silicas, such as quartz, glass beads, and glass bubbles; silicates, such as talc, clays, and calcium metasilicate; metal sulfates, such as barium sulfate, calcium sulfate, and aluminum sulfate; metal oxides such as calcium oxide, aluminum oxide, including boehmite and/or pseudo-boehmite; mineral phosphates such as apatite, including hydroxylapatite, fluorapatite, chlorapatite, and bromapatite; and mineral hydrates, such as aluminum trihydrate.

Grinding Aids

The abrasive aggregate forming slurry can also contain one or more grinding aids. Suitable grinding aids can be inorganic based, such as halide salts, for example sodium cryolite, potassium tetrafluoroborate, etc.; or organic based, such as chlorinated waxes, for example polyvinyl chloride.

Abrasive Coating Slurry and Preparation

In an embodiment, the abrasive aggregates are preferably combined with a curable resin material, or curable resin mixture formulation, that can be used to adhere the abrasive aggregates onto a surface of a backing. Processes for combining the abrasive aggregates with the resin bonding material include abrasive slurry formation, in which the abrasive aggregates, resin, and other additives are combined together until thoroughly mixed. The abrasive slurry can additionally comprise other ingredients, such as thixotropic agents, dual function materials, initiators, crosslinking agents, surfactants, chain transfer agents, stabilizers, dispersants, curing agents, reaction mediators, pigments, dyes, colorants, and fillers. In an embodiment, the slurry can include polymeric resin (monomers, oligomers, and combinations and mixtures thereof), abrasive aggregates, one or more photo-initiators, and one or more fillers. In another embodiment, the abrasive slurry may, optionally, include one or more additives, such as a defoamer.

All the slurry ingredients are thoroughly mixed together using, for example, a high shear mixer. Mixing can be conducted using high shear conditions. Typically, mixing occurs until the ingredients are thoroughly mixed. It has been surprisingly observed that the green, unfired abrasive aggregates are capable of withstanding high shear mixing conditions associated with preparation of the abrasive slurry formulation. This is particularly notable with regard to the preservation of both the solid and hollow sphere, spheroid, and toroid structures of the aggregates.

During mixing of the abrasive slurry ingredients, the ingredients may be added to the slurry one by one, in batches, or all at once. Typically the ingredients are added one by one to the abrasive slurry. If the ingredients are added one by one or in batches, the slurry can be agitated for a period of time until the ingredient has sufficiently mixed into the slurry. Typical agitation times range from about 1 minute to about 2 hours, depending on the ingredient or ingredients being added to the abrasive slurry.

In an embodiment, monomers and/or oligomer components are first mixed together under high shear conditions. Any initiators, wetting agents, defoaming agents, dispersants, and the like are then added to the mixture while continuing mixing. Then added to the mixture are any suspension agents, grinding aids, fillers, and the like while continuing mixing. Green, unfired abrasive aggregates are then added to the mixture while continuing mixing until all components are thoroughly mixed to complete the formation of the abrasive slurry formulation.

In an embodiment, the abrasive slurry formulation has a composition that can include
from about 20 wt % to about 60 wt % total polymer resin (monomers, oligomers, or combinations thereof),
from about 5.0 wt % to about 40 wt % total abrasive aggregates
from about 5 wt % to about 60 wt % of total filler, and
from about 0.2 wt % to about 10 wt % total initiator, where the percentages are based on total weight of the abrasive slurry. Optionally, from about 0.05 wt % to about 5 wt % of total additives can also be added to the abrasive slurry. The amounts of the abrasive slurry components, including any optional additives, are adjusted so that the total amounts add up to 100 wt %.

In a particular embodiment, the abrasive slurry formulation has a composition that can include
from about 10 wt % to about 45 wt % total polymer resin (monomers, oligomers, or combinations thereof),
from about 5.0 wt % to about 20 wt % total abrasive aggregates
from about 10 wt % to about 40 wt % of total filler,
from about 0.2 wt % to about 2.5 wt % total initiator, and from about 0.1 wt % to about 5.0 wt % of a total additives where the percentages are based on total weight of the abrasive slurry. The amounts of the abrasive slurry components are adjusted so that the total amounts add up to 100 wt %.

The viscosity of the abrasive slurry formulation can be monitored as it is being prepared. In an embodiment, the viscosity of the abrasive slurry can be kept in a particular range prior to the addition of the solid components. After the addition of the solid components, the abrasive slurry can have a viscosity in a particular range.

In an embodiment, the abrasive slurry can have a ratio of total polymeric resin to total green, unfired abrasive aggregate in a range from about 4.0:1.0 to about 0.8:1.0, such as about 3.5:1.0 to about 1.0:1.0, or about 3.0:1.0 to about 1.0:1.0. In another embodiment, the abrasive slurry can have a ratio of polymeric resin to filler ranging from about 2.5:1.0 to about 0.8:1.0, such as about 2.0:1.0 to about 1.0:1.0.

Polymer Resins

Suitable polymeric resin materials include curable resins selected from radiation curable resins, such as those resins curable using electron beam, UV radiation, or visible light, such as acrylated oligomers of acrylated epoxy resins, acrylated urethanes and polyester acrylates and acrylated monomers including monoacrylated, multiacrylated monomers, and thermally curable resins such as phenolic resins, urea/formaldehyde resins and epoxy resins, as well as mixtures of such resins. Indeed it is often convenient to have a radiation curable component present in the formulation that can be cured relatively quickly after the formulation has been deposited so as to add to the stability of the deposited shape. In the context of this application it is understood that the term "radiation curable" embraces the use of visible light, ultraviolet (UV) light, and electron beam radiation as the agent bringing about the cure. In some embodiments the thermal cure functions and the radiation cure functions can be provided by different functionalities in the same molecule.

The resin binder formulation can also comprise a nonreactive thermoplastic resin which can enhance the self-sharpening characteristics of the deposited abrasive composites by enhancing the erodability. Examples of such thermoplastic resin include polypropylene glycol, polyethylene glycol, and polyoxypropylene-polyoxyethene block copolymer, etc.

In an embodiment, the polymeric resin comprises a mixture of radiation curable resins including acrylated oligomers of acrylated epoxy resins, acidic acrylate oligomer, monoacrylated monomers, and multiacrylated monomers. In a particular embodiment, the total amount of polymeric resin in the abrasive slurry can be at least about 5 wt %, at least about 10 wt %, at least about 15 wt %, or at least about 20 wt %. In another embodiment, the amount of polymeric resin in the abrasive slurry can be not greater than about 75 wt %, not greater than about 70 wt %, not greater than about 65 wt %, or not greater than about 50 wt %. The amount of polymeric resin in the abrasive slurry can be within a range comprising any pair of the previous upper and lower limits. In a particular embodiment, the amount of polymeric resin included in the abrasive slurry can be in the range of at least about 20 wt % to not greater than about 70 wt %, such as at least about 25 wt % to not greater than about 65 wt %.

Aggregates—As previously discussed, suitable abrasive aggregates are those described in and produced according to the methods of U.S. Pat. No. 8,038,751 to Starling. Preferred are abrasive aggregates available from Saint-Gobain Abrasives, Inc. under the brand name Nanozyte®. In a particular embodiment, abrasive aggregates can contain aluminum oxide abrasive grit. In an embodiment, the amount of abrasive aggregate in the abrasive slurry can be at least about 0.5 wt %, at least about 1.0 wt %, at least about 3.0 wt %, or at least about 5.0 wt %. In another embodiment, the amount of abrasive aggregate in the abrasive slurry can be not greater than about 40 wt %, not greater than about 35 wt %, not greater than about 30 wt %, not greater than about 25 wt %, or not greater than about 20 wt %. The amount of abrasive aggregate in the abrasive slurry can be within a range comprising any pair of the previous upper and lower limits. In a particular embodiment, the amount of abrasive aggregate included in the abrasive slurry can be in the range of at least about 1.0 wt % to not greater than about 40 wt %, such as at least about 5.0 wt % to not greater than about 25 wt %.

Fillers—Fillers can be incorporated into the abrasive slurry formulation to modify the rheology of formulation and the hardness and toughness of the cured binders. Examples of useful fillers include: metal carbonates such as calcium carbonate, sodium carbonate; silicas such as quartz, glass beads, glass bubbles; silicates such as talc, clays, calcium metasilicate; metal sulfate such as barium sulfate, calcium sulfate, aluminum sulfate; metal oxides such as calcium oxide, aluminum oxide; and aluminum trihydrate. In an embodiment, the amount of filler in the abrasive slurry can be at least about 10 wt %, at least about 15 wt %, at least about 20 wt %, or at least about 25 wt %. In another embodiment, the amount of filler in the abrasive slurry can be not greater than about 60 wt %, not greater than about 55 wt %, not greater than about 50 wt %, not greater than about 45 wt %, or not greater than about 40 wt %. The amount of filler in the abrasive slurry can be within a range comprising any pair of the previous upper and lower limits. In a particular embodiment, the amount of filler included in the abrasive slurry can be in the range of at least about 20 wt % to not greater than about 60 wt %, such as at least about 5.0 wt % to not greater than about 25 wt %.

Grinding Aids—The abrasive slurry formulation can comprise a grinding aid to increase the grinding efficiency and cut rate. Useful grinding aids can be inorganic based, such as halide salts, for example sodium cryolite, potassium tetrafluoroborate, etc.; or organic based, such as chlorinated waxes, for example polyvinyl chloride. In certain embodiments, the grinding aids in the formulation are cryolite and potassium tetrafluoroborate. Grinding aids, typically have a particle size ranging from about 1 to 80 micron, such as from about 5 to 30 micron. The weight percent of grinding aid can range from about 0.0 to 50%, such as from about 10 to 30%.

Initiators—Suitable polymerization initiators, such as photo-initiators, can be included in the abrasive slurry formulation. In an embodiment, the initiator can be a radical polymerization initiator. In a specific embodiment, the initiator can be a bis-acyl-phosphine oxide. In another specific embodiment, the initiator can be an alpha hydroxy ketone. More than one type of initiator or mixtures of initiators can be used in the abrasive slurry mixture. In an embodiment, the amount of initiator in the abrasive slurry can be at least about 0.1 wt %, at least about 0.15 wt %, or at least about 0.2 wt %. In another embodiment, the amount of initiator in the abrasive slurry can be not greater than about 8.0 wt %, not greater than about 6.0 wt %, not greater than about 4.0 wt %, or not greater than about 3.0 wt %. The amount of initiator in the abrasive slurry can be within a range comprising any pair of the previous upper and lower limits. In a particular embodiment, the amount of initiator included in the abrasive slurry can be in the range of at least about 0.1 wt % to not greater than about 8.0 wt %, such as at least about 0.2 wt % to not greater than about 5.0 wt %.

The abrasive slurry formulations can, optionally, further comprise one or more additives, including: coupling agents, such as silane coupling agents, for example A-174 and A-1100 available from Osi Specialties, Inc., organotitanates and zircoaluminates; anti-static agents, such as graphite, carbon black, and the like; suspending agents, such as fumed silica, for example Cab-0-Sil MS, Aerosil 200; anti-loading agents, such as zinc stearate; lubricants such as wax; wetting agents; dyes; fillers; viscosity modifiers; dispersants; and defoamers. The additives can be of the same or different types, alone or in combination with other types of additives. In an embodiment, the amount of total additives in the abrasive slurry can be at least about 0.1 wt %, at least about 1 wt %, or at least about 5 wt %. In another embodiment, the amount of total additives in the abrasive slurry can be not greater than about 25 wt %, not greater than about 20 wt %, not greater than about 15 wt %, or not greater than about 12 wt %. The amount of total additives in the abrasive slurry can be within a range comprising any pair of the previous upper and lower limits. In a particular embodiment, the amount of total additives included in the abrasive slurry can be in the range of at least about 0.1 wt % to not greater than about 20 wt %, such as at least about 0.1 wt % to not greater than about 15 wt %.

Applying the Abrasive Slurry to Backing

The abrasive slurry containing the abrasive aggregate grains is preferably applied to the backing using a blade spreader to form a coating. Alternatively, the slurry coating may be applied using slot die, smooth rolling, gravure, or reverse gravure coating methods. As the backing is fed under the blade spreader at a desired coating speed, the abrasive slurry is applied to the backing in the desired thickness.

Backing materials include, any flexible web, such as polymeric film, paper, cloth (including woven, non-woven, or fleeced fabric), metallic film, vulcanized fiber, non-woven substrates, any combinations of the foregoing, and treated versions of the foregoing materials. In an embodiment, the backing comprises a polymeric film, such as a film of polyester, polyurethane, polypropylene, polyimides such as KAPTON from DuPont. In another embodiment, the backing comprises a polyester fabric. Films can be primed to promote adhesion of the abrasive aggregates to the backing. The backing can be laminated to another substrate for strength, support, or dimensional stability. Lamination can be accomplished before or after the abrasive article is formed. The abrasive article can be in the form of an endless belt, a disk, a sheet, or a flexible tape that is sized so as to be capable of being brought into contact with a workpiece.

In a particular embodiment, the deposition of the abrasive slurry formulation on the backing can be done in two or more layers. Thus for example it is possible to deposit initially a slurry formulation with a first abrasive grain and then deposit on top a second layer with a different abrasive grain. The grain content of the upper layer can then be made higher, or of a superior quality, than the grain in the lower layer. Alternatively, or additionally, the upper layer can be provided with a grinding aid component whereas the lower layer has none.

Such approaches, and others that are similar that can readily be conceived, allow the coated abrasive product to grind more efficiently.

It is also possible to provide that, where the formulation is deposited in a plurality of layers, the upper layer is itself of a more viscous formulation, perhaps as a result of the addition of higher concentrations of abrasive grains or grinding aid. This can provide part or all of the operation in which the surface portion of the slurry formulation is rendered plastic but non-flowing.

Rendering the Surface of the Abrasive Slurry Plastic but not Flowing

As described in U.S. Pat. No. 5,833,724 to Wei et al and U.S. Pat. No. 5,863,306 to Wei et al, the entire disclosure of which are included herein for all purposes, an engineered abrasive can be formed by rendering at least the surface portion of the abrasive slurry formulation plastic but not flowing. By this it is meant that the surface is sufficiently plastic that it can be embossed using an embossing tool but that it will substantially retain the embossed shape for at least 30 seconds after removal of the embossing tool. A shape is considered to have been "substantially retained" if the vertical height of the embossed shape above the substrate does not decrease by more than 10%.

Prior to embossing, the viscosity of the binder/abrasive formulation is modified in such a way as to limit the flow that would tend to occur at the lower viscosities at which the formulation is conventionally deposited. It is however not necessary that the viscosity of the whole of the formulation be adjusted to the higher level. It is often sufficient if the outer exposed portion quickly attain the higher viscosity since this can then act as a skin so as to retain the embossed hape even if the inner portion retains a relatively lower viscosity for a longer period.

Viscosity modification of at least the surface layers can be achieved for example by incorporating in to the formulation a volatile solvent that is rapidly lost when the formulation is deposited on the backing material, perhaps with the assistance of an increased ambient temperature or by a localized blast of hot gas.

Temperature of course can also affect the viscosity. It is therefore important to balance these competing effects to ensure that the result is increasing viscosity. One factor assisting in this direction would be a tendency for increased temperature to cause accelerated curing in the case of thermally curable resin systems. Another option would be to decrease the temperature of the structure such that the viscosity is increased. This could be done for example by passing the substrate with the layer of deposited abrasive slurry formulation thereon under a chilled roll and/or under a cold gas flow.

In addition to adjustment by change of temperature or removal of liquid, it is possible to change the viscosity by increasing the solids loading. In general, it is sufficient that the surface layer of the abrasive slurry achieve the higher viscosity so as to hold a shape subsequently embossed thereon. Thus applying a finely divided "functional powder" on to the surface of the structure will act to form a localized "skin" of increased viscosity upon the structure causing it to retain an imposed shape until curing renders the shape permanent.

In the present application the term "functional powder" is used to refer to finely divided, (that is, with an average particle size, $D_{50}$, of less than 250 micrometers), material that modifies the properties of the formulation. This can be as simple as a viscosity modification or an improved property in the cured formulation such as grinding efficiency. The functional powder can also act to serve as a releasing agent or a barrier between the resin formulation and the embossing tool, reducing sticking problems and allowing improved release from the embossing tool.

The powder can be applied in the form of a single layer on top of the abrasive slurry formulation or in several layers to form a structured composite having unique grinding properties. This is in fact an advantageous and preferred aspect of the present embodiments.

The powder itself can be an abrasive grain, additional green, unfired abrasive aggregates, a variety of powdered materials, or a combination of the previous, conferring advantageous properties. Abrasive grains usable as the functional powder can consist of any type of abrasive grain and grit size, and can be the same or different than the grain used in the abrasive slurry formulation and can lead to unique grinding characteristics. The functional powder can also consist of any of the family of grinding aids, antistatic additives, any class of fillers, and lubricants.

Depending on the application, in particular embodiments the functional powder deposited on the slurry surface can impart unique grinding characteristics to the abrasive products. Examples of functional powders include: 1) abrasive grains-all types and grit sizes; 2) fillers-calcium carbonate, clay, silica, wollastonite, aluminum trihydrate, etc.; 3) grinding aids—KBF, cryolite, halide salt, halogenated hydrocarbons, etc.; 4) anti-loading agents-zinc stearate, calcium stearate, etc., 5) anti-static agents-carbon black, graphite, etc., 6) lubricants-waxes, PTFE powder, polyethylene glycol, polypropylene glycol, polysiloxanes etc.

The deposition of the functional powder layer(s) can be done using a variety of conventional deposition methods, including gravity coating, electrostatic coating, spraying, vibratory coating, etc. The deposition of varying functional powders can occur simultaneously, or in an ordered fashion, to create a composite structure before embossing.

Embossing a Pattern onto the Surface of the Abrasive Slurry

After the increase in viscosity has been achieved, the layer is embossed to impose a pattern. This pattern can comprise isolated islands of formulation, or a pattern of ridges separated by valleys. The patterns are generally designed to provide an abrasive product with a plurality of grinding surfaces equidistant from the backing with the area of grinding surface increasing with erosion of the layer. Between the grinding surfaces, channels are often provided to allow circulation of grinding fluids and removal of swarf generated by the grinding.

Embossing can be accomplished by an embossing tool such as a plate forced into contact with the layer of formulation or, often more simply, the tool can comprise a roller with the desired pattern engraved on its surface which when contacted with the slurry formulation imposes the reverse of the pattern engraved on the surface. In addition, the embossing tool can be heated or chilled so as to contribute to the raising of the viscosity to render the formulation surface plastic but non-flowing. The heating however, should not be to such a level that the binder cures while in contact with the tooling. By adjusting the viscosity of the resin formulation or the surface layer, the ultimate goal is that after embossing, the shape imposed by the embossing tool is substantially retained for at least 30 seconds and preferably for a minute. Most preferably the shape is retained until later cure of the binder component can be effected.

The embossed pattern can be any pattern conducive to creating or promoting an abrasive surface. Suitable patterns include protrusions, depressions, or combinations thereof. The protrusions and depressions can be regular or irregular in shape, height, depth, lateral spacing, radial orientation, and combinations thereof. In an embodiment, the protrusions may have a shape, such as a ridge, or as regular or irregular geometric frustra (also known as pyramidal frustra), such as a conical shape, a pyramidal shape, prism shape, a cubic shape, a quadrilateral shape, or any combination thereof. Such shaped protrusions may be ordered in closely arranged in rows with spacing of about 5 to about 80 rows per inch. Alternatively, the shaped protrusions may be uniformly or randomly distributed with spacing of about 5 to about 80 rows per inch. In another example, the protrusions may include pyramidal shapes that are sized and spaced at 10 to 60 pyramids per inch. In particular embodiments, the pattern can be one or a combination of the following patterns:

"17 Hexagonal" pattern comprised of cells 559 microns in depth with equal sides of 1000 microns at the top and 100 microns at the bottom;

"25 Tri-helical" pattern comprised of a continuous channel cut at 45 degrees to the roll axis that has a depth of 508 microns and top opening width of 750 microns;

"40 Tri-helical" pattern comprised of a continuous channel cut at 45 degrees to the roll axis that has a depth of 335 microns and a top opening width of 425 microns;

"45 Pyramidal" pattern comprised a square-based, inverted pyramid shaped cells with a depth of 221 microns and a side dimension of 425 microns;

"10 Quad" pattern comprised of quadrilateral pyramidal frustra with a depth of 500 microns, top opening width of 2500 microns, and bottom opening width of 1620 microns. Other particular embodiments include: 25 random tri-helical, 35 random tri-helical, 50 random tri-helical, 25 tri-helical, 40 tri-helical, 50 tri-helical, 75 tri-helical, 45 pyramid, 10 quad, 16 quad, or any combination thereof. Additional variations in spacing and depth of the above pyramidal, quadrilateral ("quad"), hexagonal, and tri-helical patterns are contemplated and can be used in accordance with the present embodiments.

It is often preferred that the embossed surface is relatively tacky after the embossing process so that a functional powder can be deposited thereon before the cure is completed such that completion of the cure causes the functional powder to become adhered to the outer surface of the embossed shape. Where the functional powder is an abrasive, this greatly increases the aggressiveness of the initial cut. In addition, if the functional powder is a grinding aid or anti-loading additive, it is located in the optimum position relative to the abrasive grains in the composites. Alternatively, it is possible to apply over the embossed surface, whether cured or uncured, a fine layer of an adhesive and thereafter a further coating of the functional powder of the kinds discussed above. The adhesive can be of the same or different type as is present in the abrasive slurry formulation.

Curing the Abrasive Slurry

Curing—Curing can be accomplished by use of radiation or thermal sources. Where the cure is thermal, appropriate means can include ovens, hot lamps, heaters, and combinations thereof. Where the cure is activated by photo-initiators, a radiation source can be provided. In an embodiment, ultraviolet (UV) radiation curing can be employed. In a particular embodiment, multiple UV sources can be used, such as two 300 watt sources: a D bulb and an H bulb, where the exposure is controlled by the rate at which the patterned substrate passed under the UV sources. In another embodiment, UV cure can be immediately followed by a thermal cure.

Once the resin is fully cured, the engineered coated abrasive is complete and can be used for a variety of stock removal, finishing, and polishing applications.

The present embodiments make use of polymeric resin without solvent or water (trace impurities may be present), therefore the weight percent composition of the polymeric resin after cure (i.e., the cured abrasive slurry formulation, or simply the cured abrasive formulation) is essentially the same as given for the uncured abrasive slurry before cure. In an embodiment, the cured abrasive formulation has a composition that can include from about 20 wt % to about 60 wt % total polymer resin (monomers, oligomers, or combinations thereof), from about 5.0 wt % to about 40 wt % total abrasive aggregates from about 5 wt % to about 60 wt % of total filler, and
from about 0.2 wt % to about 10 wt % total initiator, where the
percentages are based on total weight of the cured abrasive
formulation. Optionally, from about 0.05 wt % to about 5 wt
% of total additives can also be present in the cured abrasive
formulation. The amounts of the abrasive formulation components, including any optional additives, are adjusted so that
the total amounts add up to 100 wt %.

In a particular embodiment, the cured abrasive formulation
has a composition that can include
from about 10 wt % to about 45 wt % total polymer resin
(monomers, oligomers, or combinations thereof),
from about 5.0 wt % to about 20 wt % total abrasive aggregates
from about 10 wt % to about 40 wt % of total filler,
from about 0.2 wt % to about 2.5 wt % total initiator, and
from about 0.1 wt % to about 5.0 wt % of a total additives
where the percentages are based on total weight of the abrasive slurry. The amounts of the cured abrasive components are
adjusted so that the total amounts add up to 100 wt %.

Abrasion of Surfaces

The abrasive product can be used for stock removal, finishing, and polishing of surfaces, including uncoated and
coated surfaces. Using the abrasive product, polishing of the
surfaces can be performed by manual or automated processes.
For example, polishing machines such as those available from
Struers, Inc. of Westlake, Ohio), Grinding Equipment &
Machinery Company, LLC. ("GEM") (Youngstown, Ohio,
USA), Loeser-USA Inc. (Brighton, Mich., USA), Supfina
Machine Company, Inc. (North Kingstown, R.I., USA), and
Dynabrade Inc. (Clarence, N.Y., USA), among others, can be
used. Such polishing machines and processes are known in
the art and typically take advantage of embodiments of the
abrasive product in the form of sheets, discs, endless belts,
tapes, or polymeric films.

State-of-art conventional finishing processes are typically
accomplished by a multi-step, incremental process. The surface is first polished with a relatively coarse abrasive material
and then polished again with a somewhat finer grit abrasive
material. This process is usually repeated several times, with
each successive polishing being carried out with a progressively finer grit abrasive until the surface is polished to the
desired degree of smoothness. This type of multi-step polishing procedure has conventionally been required because it is
generally understood that the grains of an abrasive must be on
the same scale as the size of the defect (e.g., scratches, pig
tails, fish eyes, dust) that are to be removed.

In contrast to the conventional multi-step procedure, however, it has been quite surprisingly and unexpectedly observed
that coated surfaces can be polished down to a an acceptable
surface roughness using a reduced number of polishing steps,
sometimes even in only a single step, as well as, using only a
single abrasive product, rather than multiple different abrasive products. This result is quite surprising and highly advantageous. This results in a considerable reduction in the time
needed to achieve a desired degree of polishing smoothness,
as well as marked reduction in costs due to time saved by not
having to switch out successive different abrasive products, as
well as not needing to use the multiple abrasive products.
Without being bound by theory, it is believed that the advantage may be derived, at least in part, from the synergistic
effect of the unique properties of the green, unfired abrasive
aggregates in combination with the three dimensional abrasive structures that result from the embossing of the abrasive
slurry composition.

Various surface roughness parameters are known in the art
and used to describe the surface quality of an abraded surface.
The arithmetical mean ("average") roughness, or Ra, of a
surface is a measure of the degree of variations in the overall
height profile of a surface over a given standard length. Root
mean square roughness, Rq, also called Rrms, is a measure of
the root mean square of the roughness over a given standard
length. Maximum peak, or maximum height, Ry, measures
the maximum distance between the highest peak and the
lowest valley along a standard length. Ten-point mean roughness, Rz, is a measure of the average of the five highest peaks
and the five lowest valleys. Lower Ra, Rq, Ry, and Rz values
are generally indicative of a surface that is smoother and has
smaller variations in its overall height between differing locations on the surface (i.e., it has a generally smoother surface
profile).

Alternatively, there are many surface quality parameters
that are subjective and depend upon the observations of experienced human operators for quality assessment. For
example, visual assessment, touch, and even sound produced
during the abrading process can be used to judge surface
quality during an abrasion process.

The properties and advantage of the present disclosure are
illustrated in further detail in the following nonlimiting
examples. Unless otherwise indicated, temperatures are
expressed in degrees Celsius, pressure is ambient, and concentrations are expressed in weight percentages.

Components Listing

Bisphenol-A epoxy diacrylate with 50% Trimethylol-propane triacrylate (TMPTA) (Cytec Industries Inc., Woodland
Park, N.J.).

Acidic Acrylate oligomer (Cytec Industries Inc., Woodland Park, N.J.) (Sartomer USA, LLC, Exton, Pa.)

BYK-A501—defoaming agent (BYK USA Inc., Wallingford, Conn.).

2-Hydroxy-2-methyl-1-phenyl-propanone-photo-initiator
(Cytec Industries Inc., Woodland Park, N.J.) (BASF Corporation, Florham Park, N.J.).

*2,2-Dimethyl-1,2-diphenylethan-1-one-photo-initiator
(Cytec Industries Inc., Woodland Park, N.J.) (BASF Corporation, Florham Park, N.J.)

Bis(2,4,6-trimethylbenzoyl)phenyl-phosphine oxide-photo-initiator (BASF Corporation, Florham Park, N.J.)

Calcium silicate—filler (NYCO Minerals, Inc., Willsboro,
N.Y.)

Nanozyte 147—green, unfired abrasive aggregate, 16 μm
medium primary particle size of white aluminum oxide WA
1000 (Saint Gobain Abrasives, Inc., Worcester, Mass.); 11.5
μm medium primary particle size of white aluminum oxide
WA 1000 (Saint Gobain Abrasives, Inc., Worcester, Mass.), Example 1

Making of Engineered Coated Abrasive Product

A. Abrasive Slurry Preparation

An abrasive slurry composition was made by mixing
together the following components listed in the table below.

TABLE 1

Abrasive Slurry Composition(s)

| Component | Abrasive Slurry 1 Wt % |
|---|---|
| Bisphenol-A epoxy diacrylate with 50% TMPTA | 40.02 |
| Acidic Acrylate oligomer | 2.2 |
| BYK A501 | 0.12 |
| 2-Hydroxy-2-methyl-1-phenyl-propanone | 1.17 |

TABLE 1-continued

Abrasive Slurry Composition(s)

| Component | Abrasive Slurry 1 Wt % |
|---|---|
| Bis(2,4,6-trimethylbenzoyl)phenyl-phosphine oxide | 0.33 |
| Calcium silicate | 36.16 |
| Nanozyte 147 (16.5 µm) | 20.0 |
| Total | 100.0 |

A mixture of bisphenol-A epoxy diacrylate with 50% TMPTA was added to a mixing vessel. Acidic acrylate oligomer, BYK A501, and 2-hydroxy-2-methyl-1-phenyl-propanone were added to the mixture under agitation. Bis(2,4,6-trimethylbenzoyl)phenyl-phosphine oxide was then added and agitated until fully dissolved. Calcium silicate was added to the mixture under agitation. Nanozyte 147 abrasive aggregate was then added to the mixture and agitated until thoroughly mixed.

B. Abrasive Belt Preparation

Figure 2:
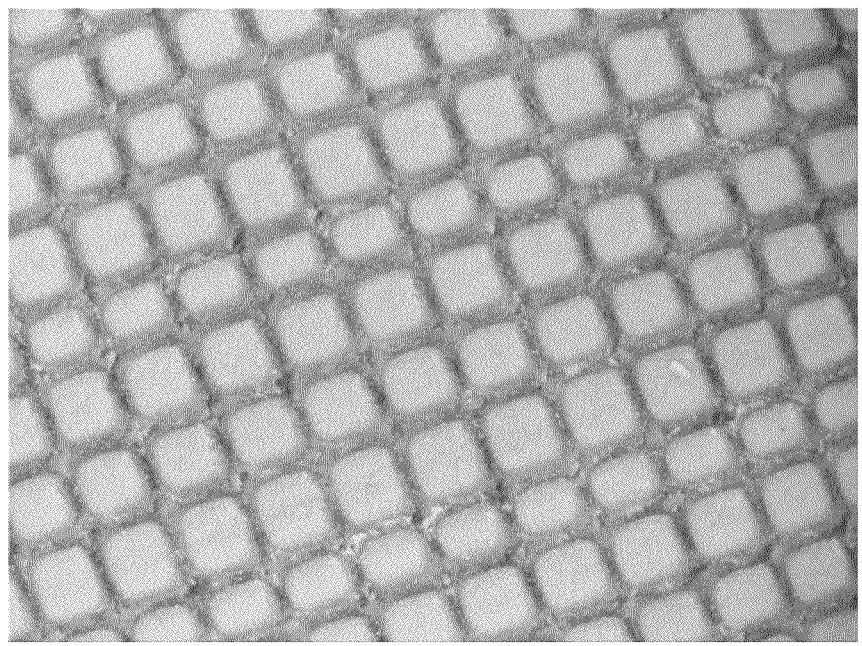
FIG. 2 is a photograph showing a top view of an embodiment of an engineered abrasive product with a "16 quad" embossed pattern that has green unfired aggregates applied to the surface of the embossed pattern and that are also dispersed within the cured polymer that forms the quadrilateral frustra.
Figure 3:
FIG. 3 is a close-up photograph of the same embodiment as FIG. 2 showing the layer of green unfired aggregates on the surface of the quadrilateral frustra.
Figure 4:
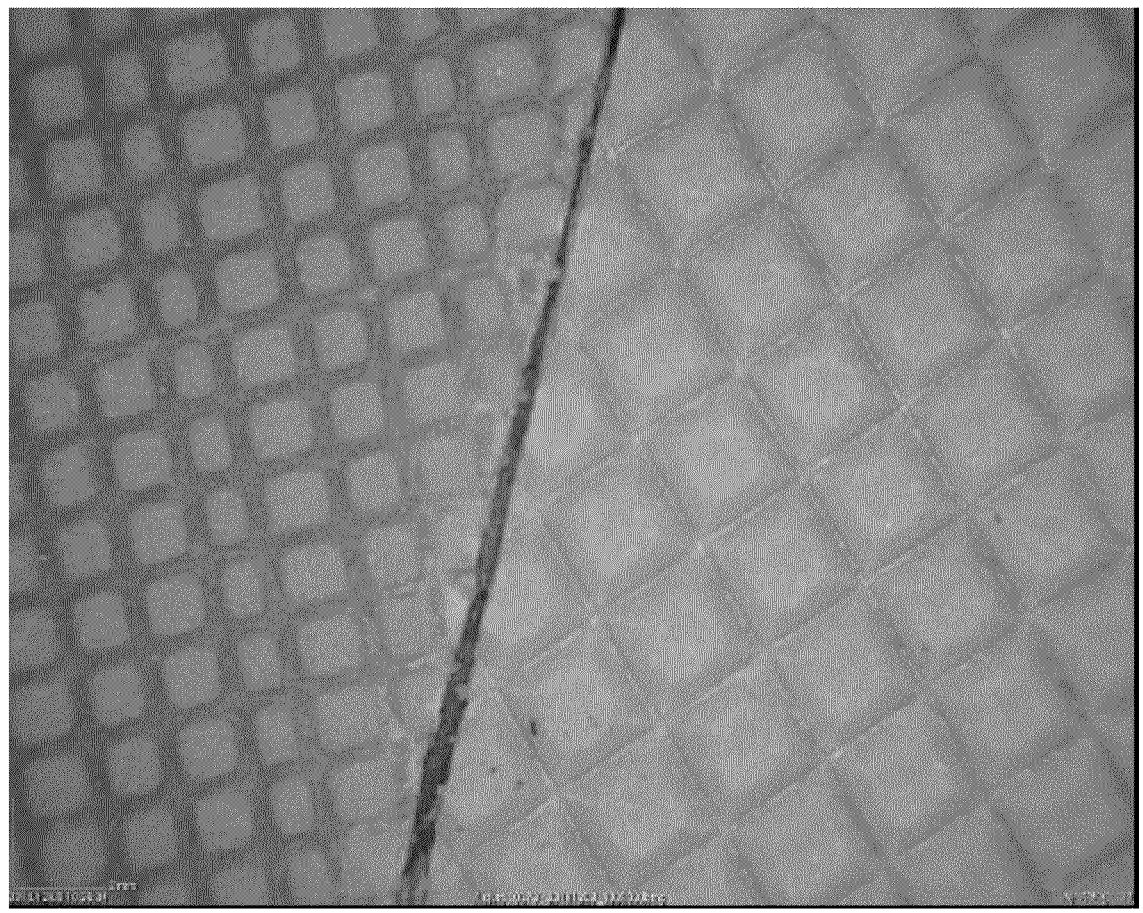
FIG. 4 is a photograph showing two different embodiments of engineered coated abrasives, the one on the left having a "16 quad" pattern and the one on the right having a "10 quad" pattern.
Figure 5:
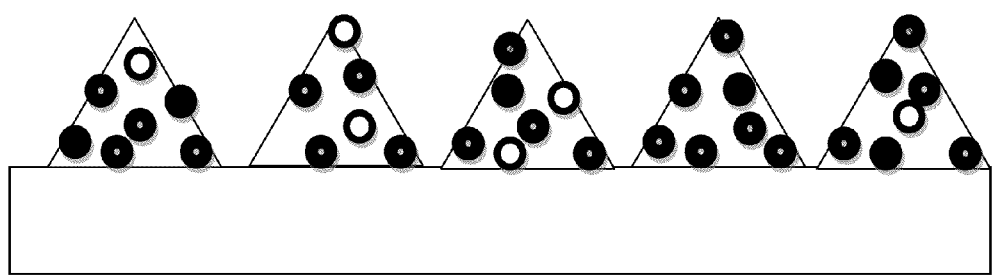
FIG. 5 is a cross-sectional illustration of an embodiment of an engineered coated abrasive article having green unfired aggregates dispersed in a polymeric slurry.
Figure 6:
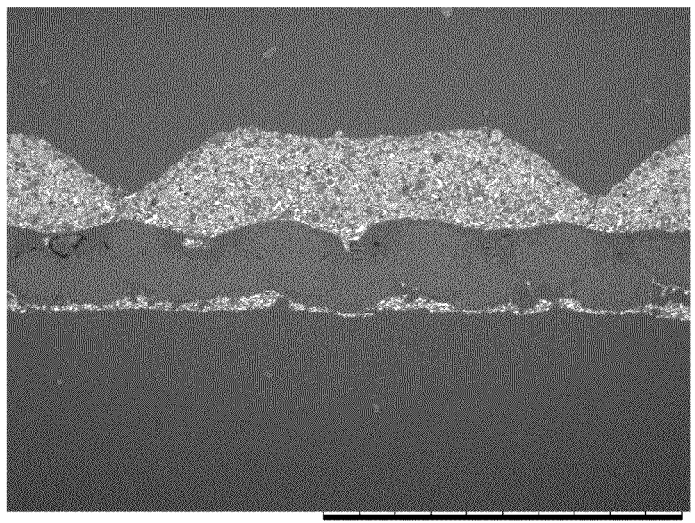
FIG. 6 is a photomicrograph from a scanning electron microscope showing a cross-section of an embodiment of an abrasive belt according to the present invention.
Figure 7:
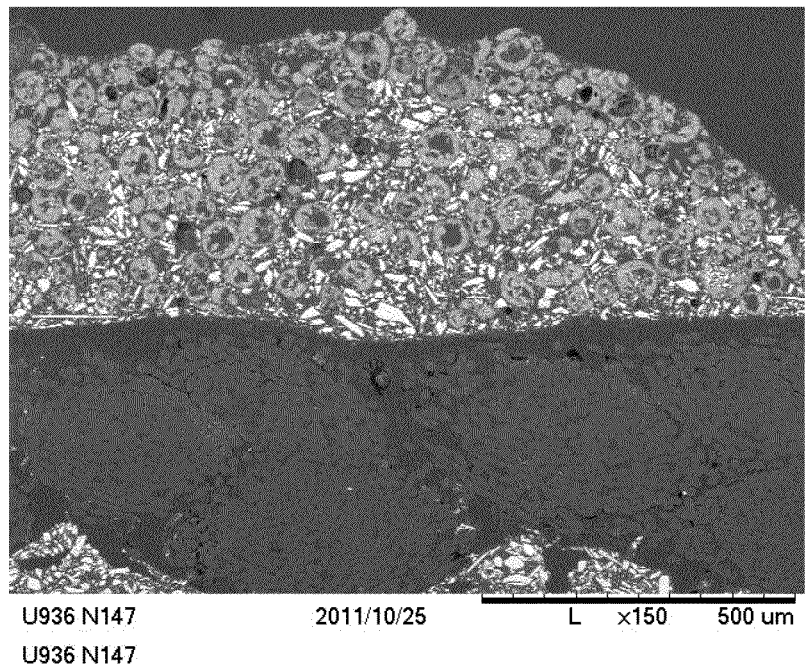
FIG. 7 is a photomicrograph from a scanning electron microscope showing a magnified cross-section of an embodiment of an abrasive belt according to the present invention.
Figure 8:
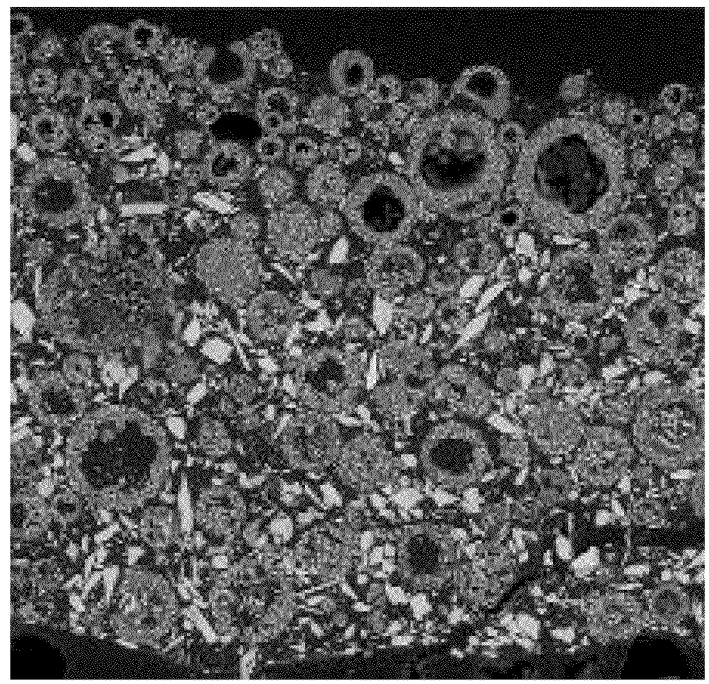
FIG. 8 is a photomicrograph from a scanning electron microscope showing a magnified cross-section of an embodiment of abrasive aggregate dispersed in cured polymer that form the frustra of the engineered coated abrasive according to the present invention.
Figure 9:
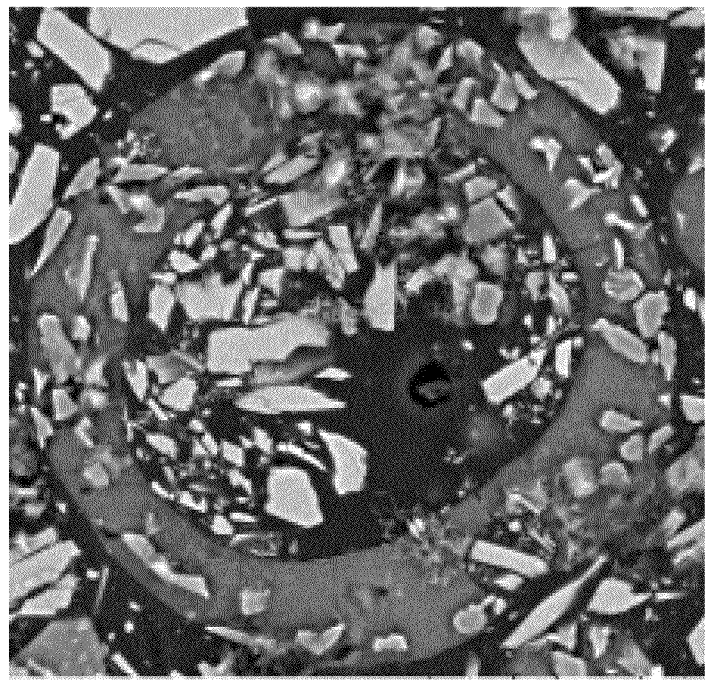
FIG. 9 is a photomicrograph from a scanning electron microscope showing a magnified cross-section of an embodiment of abrasive aggregate dispersed in cured polymer according to the present invention.
Figure 10:
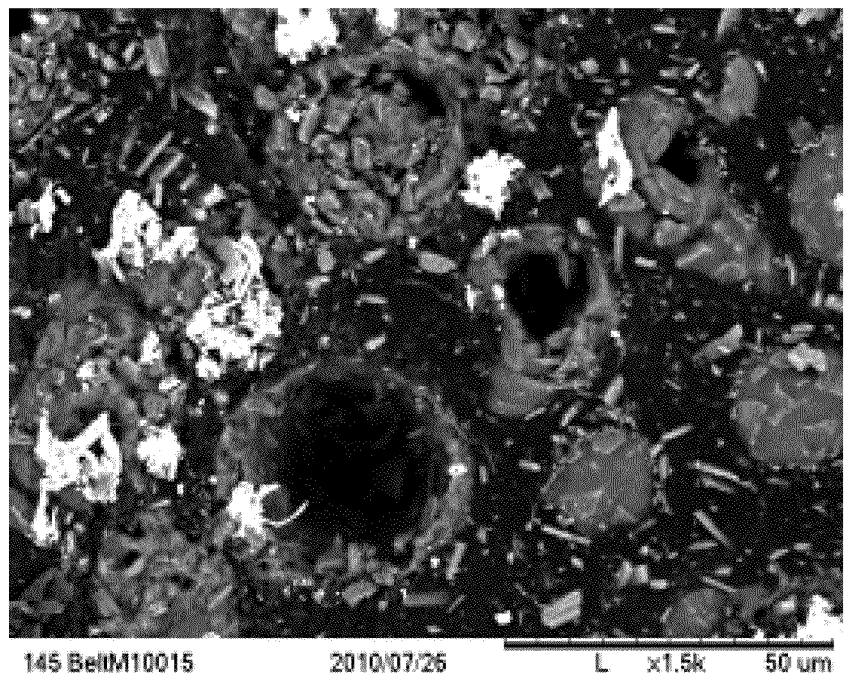
FIG. 10 is a photomicrograph from a scanning electron microscope showing a magnified top view of the worn surface of an abrasive belt according to the present invention.

The Abrasive Slurry Composition 1 was applied to a polyester cloth backing using a blade coater. Then same Nanozyte 147 abrasive aggregates were deposited onto the slurry layer to render at least the surface portion of the abrasive slurry formulation plastic but non-flowing. Thereafter, a 10 Quad pattern (10 pyramidal frustra cells per line per inch having a depth of 500 microns) as shown in FIG. 2 and FIG. 3 was formed by embossing the surface of the abrasive slurry formulation. The embossed surface was then UV cured to retain the pattern of three dimensional structures. The curing was adequate to ensure final dimensional stability. The produced engineered coated abrasive article was then flexed and made into a 6 inch×98 inch engineered coated abrasive belt.

Example 2

Polishing of Metal Surfaces

The engineered coated abrasive belt was installed on a Loeser RSP374 Centerless grinder for testing according the protocol shown in Table 2.

TABLE 2

Test and Machine Setting Parameters of Loesser RSP374 Centerless Grinder

| Belt Speed (SFPM): | 7400 | Con. Whl. Hardness-Durometer: | 65 |
|---|---|---|---|
| Contact Whl. RPM: | 1766 | Reg. Whl. Hardness-Durometer: | 55 |
| Reg. Wheel RPM: | 112 | Reg. Wheel Swing Deg.: | 2 |
| Reg. Whl. Tilt Deg.: | 5 | Coolant: | Trim Clear @ 2% Ratio with DI water. |
| Workpiece Material Type 304 SS | | Workpiece Size 1.5" × 20" | Workpiece Hardness 22-24 HRC |

Forty pre-ground stainless steel work pieces were passed through the centerless grinding machine. The weight and surface finish of the parts were measured for parts 1, 5, 10, 15, 20, and 40. A Mettler Toledo scale and a Mahr Perthometer M2 were used to measure the amount of metal removal and surface finish, respectively for each measured part. During the grinding test, a conventional state of the art cork belt (Norton W442 C600), commonly used for "final" finishing, was used as a bench mark.

Figure 11:
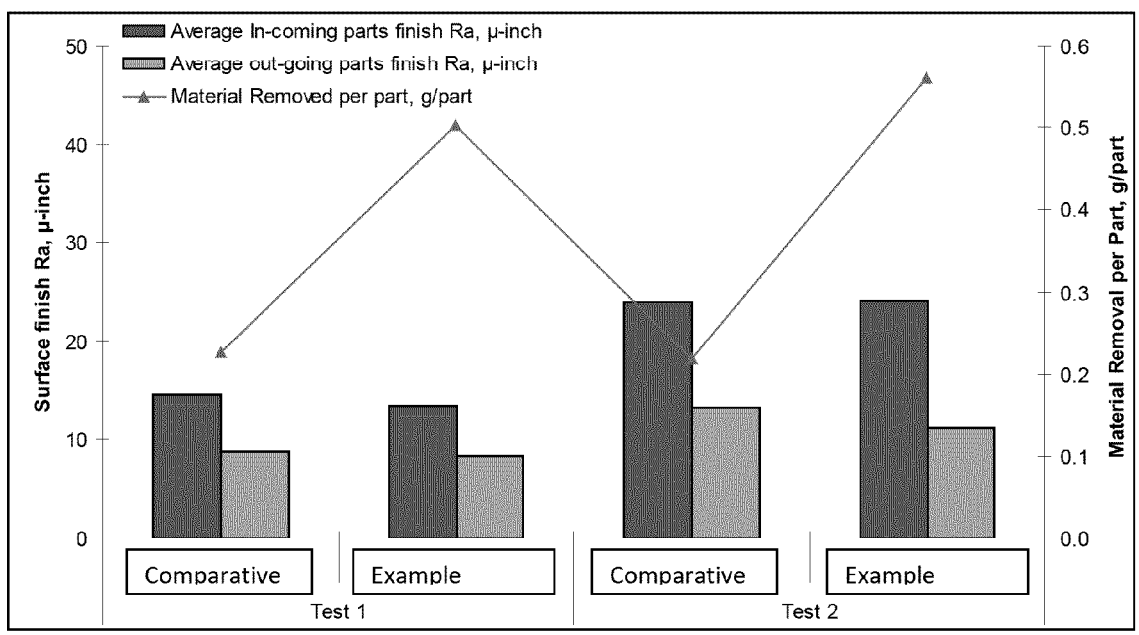
FIG. 11 is a graph showing the results of comparative testing of an embodiment of an inventive engineered abrasive belt according to the present invention and a conventional cork abrasive belt.

To demonstrate the finishing capability of both belts, each was tested on parts having two different in-coming surface finishes: test 1—avg. in-coming surface finish Ra of 12-14, and test 2—avg. in-coming surface finish of 22-25µ·inch. Test results comparing the avg. outgoing surface roughness (Ra) and material removal (g/part) are summarized in Table 3. and shown graphically in FIG. 11.

TABLE 3

Summary of Centerless Grinding Test Result

| | | Average In-coming parts finish Ra, µ-inch | Average out-going parts finish Ra, µ-inch | Material Removed per part, g/part |
|---|---|---|---|---|
| Test 1 | Comparative | 14.5 | 8.8 | 0.23 |
| | Example | 13.4 | 8.3 | 0.50 |
| Test 2 | Comparative | 23.9 | 13.19 | 0.22 |
| | Example | 24.08 | 11.23 | 0.56 |

The example belt had a higher material removal rate than the conventional belt (more than twice the material removed), yet surprisingly also produced a superior outgoing surface finish (less rough) on the workpiece in both test 1 and test 2. Significantly, in test 2, the example belt, apparently due to its higher material removal rate, was even able to produce a superior out-going surface finish over the conventional belt even though the workpiece had a coarser in-coming surface finish.

It is clearly demonstrated that the example engineered abrasive belt produced a fine surface finish and superior abrasive performance compared to the conventional cork belt.

Example 3

Making of Engineered Coated Abrasive Product

A. Abrasive Slurry Preparation

An abrasive slurry composition was made by mixing together the following components listed in the table below.

TABLE 4

Abrasive Slurry Composition 2

| Component | Abrasive Slurry 1 Wt % |
|---|---|
| Bisphenol-A epoxy diacrylate | 12.6 |
| Trimethylol-propane triacrylate | 29.4 |
| BYK A501 | 0.12 |
| 2,2-Dimethyl-1,2-diphenylethan-1-one | 1.7 |
| Bis(2,4,6-trimethylbenzoyl)phenyl-phosphine oxide | 0.18 |
| $KBF_4$ | 24 |
| Calcium Silicate | 12 |
| Nanozyte 147 (11.5 µm) | 20 |
| Total | 100.0 |

The mixture was thoroughly mixed using the procedure previously described above in Example 1 A to form an abrasive slurry mixture (Abrasive slurry composition 2).

B. Abrasive Belt Preparation

The Abrasive Slurry Composition 2 was used to construct an engineered coated abrasive article using the procedure previously described above in Example 1B. A 35 RTH pattern (35 random tri-helical) was embossed on the surface of the abrasive slurry formulation and cured as previously described above. The produced engineered coated abrasive article was then flexed and made into a 3 inch×132 inch engineered coated abrasive belt.

Example 4

Grinding Test

The engineered coated abrasive belt was installed on a Loeser RSP374 Centerless grinder for testing according the protocol shown in Table 4.

TABLE 5

Test and Machine Setting Parameters of Loesser RSP374 Centerless Grinder

| Material: | 304 STAINLESS | Belt Speed: | 7000 SFM |
|---|---|---|---|
| Dimension: | 1" × 3" × 9¾" | Test Speed: | 7 SFM |
| Force: | 10.5 LB | Contact wheel: | 40D smooth |

The belt was installed on a bench backstand grinder for testing according to the protocol listed in the table and according to the following procedures. A 304 stainless steel workpiece with an intersection of 1" by 3" was pushed against the belt for 30 second at setting force and speed. During the grinding test, a conventional state of the art belt prepared with finer grit loose abrasive particles (Norton NORAX® U243 X4), commonly used for "final" finishing, was used as a control. Each of the belts was tested for total of 15 minutes grinding time. The weight of the parts was taken after each 30 sec grind. Three surface finish measurements were taken at 3, 6, 9, 12, and 15 minutes at different spots of the work-surface. A Mettler Toledo scale and a Mahr Perthometer M2 were used to measure the metal removal and surface finish, respectively.

Grinding test results comparing the avg. cut rate for 15 min. grinding time (g/part) and average surface roughness (Ra—micro inches) are summarized in Table 6.

TABLE 6

Summary of Centerless Grinding Test Result

| | Abrasive particle type | Primary particle medium size, micron | Average Cut rate for 15 min grinding time, g/min | Avarage surface finish Ra, μ-in |
|---|---|---|---|---|
| Control | white aluminum oxide | 4 micron | 0.2 | 4.73 |
| Example | Nanozyte aggregate of white aluminum oxide | 11.5 micron | 0.54 | 2.84 |

The example belt had a higher material removal rate than the conventional belt (more than twice the material removed), yet surprisingly also produced a superior outgoing surface finish (less rough, more smooth) on the workpiece. Surprisingly and significantly, the example belt was able to achieve a smoother surface finish than the control belt even though the primary particle medium size of the example belt was more than double that of the control belt.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An engineered coated abrasive product comprising:
   a backing;
   a cured abrasive composition, and
   functional powder,
   wherein the cured abrasive composition comprises
      cured polymeric resin, and
         abrasive aggregates dispersed within the cured polymeric resin,
      wherein the abrasive aggregates are green, unfired and have a generally spheroidal or toroidal shape and are formed from a composition comprising abrasive grit particles dispersed in a nanoparticle binder,
   wherein the cured abrasive composition is disposed on the backing,
   wherein the functional powder is disposed on the surface of the cured abrasive composition,
   wherein the functional powder comprises abrasive aggregates that are green, unfired and have a generally spheroidal or toroidal shape and are formed from a composition comprising abrasive grit particles dispersed in a nanoparticle binder,
   wherein the surface of the abrasive composition is embossed with a pattern, and
   wherein the total amount of cured polymeric resin and the total amount of abrasive aggregates are present in a ratio ranging from 4.0:1.0 to 0.8:1.0.

2. The engineered coated abrasive product of claim 1,
   wherein the total amount of polymeric resin ranges from 20 wt % to 60 wt %, and
   wherein the total amount of abrasive aggregate ranges from 1 wt % to 40 wt %.

3. The engineered coated abrasive product of claim 1, further comprising at least one of a filler, an initiator, or an additive dispersed within the polymeric resin.

4. The engineered coated abrasive product of claim 3, further comprising a filler dispersed within the polymeric resin.

5. The engineered coated abrasive product of claim 3, further comprising an initiator dispersed within the polymeric resin.

6. The engineered coated abrasive product of claim 3, further comprising an additive dispersed within the polymeric resin.

7. The engineered coated abrasive product of claim 3,
   wherein the total amount polymeric resin ranges from 20 wt % to 60 wt %;
   wherein the total amount of abrasive aggregate ranges from 5.0 wt % to 40 wt %;
   wherein the total amount of filler ranges from 5 wt % to 60 wt %;
   wherein the total amount of initiator ranges from 0.2 wt % to 10 wt %; and
   wherein the total amount of additive ranges from 0.05 wt % to 5 wt %.

8. The engineered coated abrasive product of claim 3, wherein the total amount of cured polymeric resin and the total amount of filler are present in a ratio ranging from 2.5:1.0 to 1.0:1.0.

9. The engineered coated abrasive product of claim 1, wherein the polymeric resin is curable using electron beam, UV radiation, or visible light.

10. The engineered coated abrasive product of claim 1, wherein the abrasive aggregate comprises abrasive grit particles selected from the group consisting of carbides, oxides, nitrides and carbonaceous materials.

11. The engineered coated abrasive product of claim 1, wherein the embossed pattern is selected from the group consisting of 17 Hexagonal, 25 Tri-helical, 40 Tri-helical, 45 Pyramidal, 25 random Tri-helical, 50 random Tri-helical, 25 Tri-helical, 50 Tri-helical, 75 Tri-helical, 10 quad, 16 quad, or any combination thereof.

* * * * *

UNITED STATES PATENT AND TRADEMARK OFFICE
CERTIFICATE OF CORRECTION

PATENT NO.        : 9,138,867 B2  
APPLICATION NO.   : 13/839921  
DATED             : September 22, 2015  
INVENTOR(S)       : Ying Cai et al.

Page 1 of 1

It is certified that error appears in the above-identified patent and that said Letters Patent is hereby corrected as shown below:

ON THE TITLE PAGE a. On page 2, under item (56) References Cited, U.S. PATENT DOCUMENTS, "5,436,053 A 7/1995 Herum" should appear as --5,436,063 A 7/1995 Follett et al.--.

b. On page 2, under item (56) References Cited, U.S. PATENT DOCUMENTS, "7,066,601 B2 6/2006 Lee et al" should appear as --7,066,801 A 6/2006 Balijepalli et al.--.

c. On page 2, under item (56) References Cited, U.S. PATENT DOCUMENTS, add "6,648,999 B2 11/2003 Burdon et al.".

Signed and Sealed this  
Twenty-second Day of March, 2016

Michelle K. Lee  
*Director of the United States Patent and Trademark Office*